Patented Aug. 15, 1950　　　　　　　　　　　　　　　　　　2,518,896

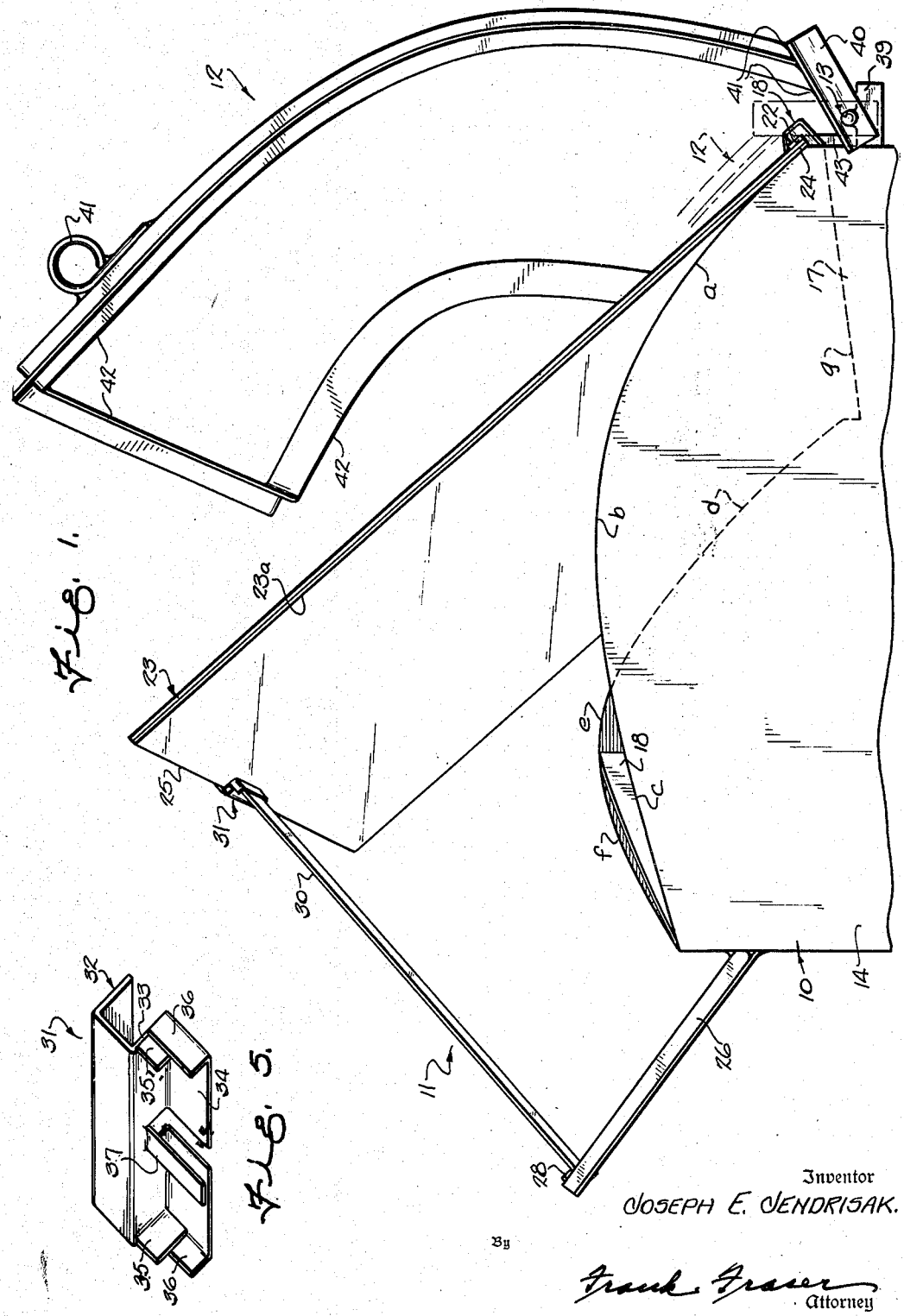

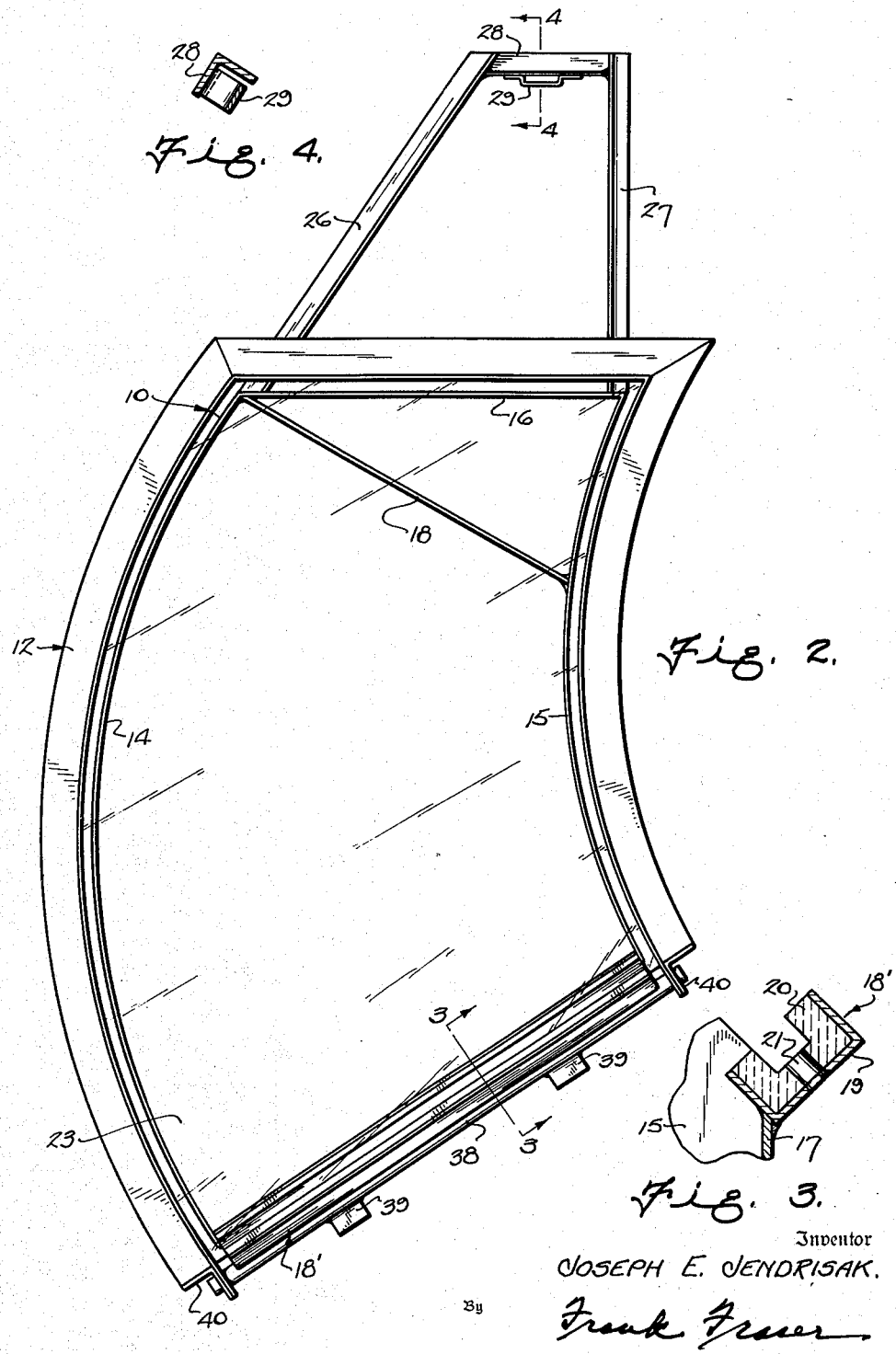

UNITED STATES PATENT OFFICE 2,518,896

METHOD AND APPARATUS FOR BENDING GLASS SHEETS

Joseph E. Jendrisak, Rossford, Ohio, assignor to Libbey-Owens-Ford Glass Company, Toledo, Ohio, a corporation of Ohio Application January 10, 1946, Serial No. 640,246

16 Claims. (Cl. 49—7)

The present invention relates to a method and apparatus for shaping of thermoplastic materials, and more particularly to an improved method and apparatus for bending glass sheets to predetermined surface contours.

It is a primary object of the invention to provide a method and apparatus to quickly, efficiently and economically shape heated glass sheets to complicated, compound curvatures of a character that will be extremely difficult if not impossible to produce with the methods and equipment heretofore known.

Another object is the provision of a different kind of bending technique, which combines both gravity and mechanical pressure bending, and includes the feature of supporting the glass sheet against the bending force exerted by gravity until the glass reaches a predetermined temperature.

Still another object is to provide a novel and efficient apparatus for carrying out the above procedures, including a number of elements which may be used either in or out of combination with one another.

In connection with this apparatus, some more specific objects of the invention are: the provision of temporary supporting means for the glass sheet which will automatically withdraw its support when the glass reaches the desired bending temperature; and a hinged pressure member that can be swung into and out of engagement with the sheet to be bent.

Other objects and advantages of the invention will become more apparent during the course of the following description, when taken in connection with the accompanying drawings.

In the drawings, wherein like numerals are employed to designate like parts throughout the same:

Fig. 1 is a side elevation of a bending device embodying my invention, and including a male bending mold equipped with a special, auxiliary, pressure bending apparatus;

Fig. 2 is a plan view of the device of Fig. 1, with the thermostatically operable element of the supporting means removed, the glass fully bent, and the hinged pressure member in lowered position;

Fig. 3 is a fragmentary section taken substantially on the line 3—3 in Fig. 2;

Fig. 4 is a sectional view taken substantially on the line 4—4 in Fig. 2; and

Fig. 5 is a perspective view of the retaining clip for temporarily holding the glass sheet to be bent, and its supporting means, in assembled relation.

By the method, and with the apparatus, of this invention a heated glass sheet can be shaped to practically any desired contour, from a simple, shallow, regularly curved, one-way bend, to a surprisingly deep and severe compound bend, of varying and irregular curvature, with equal facility.

However, as indicated above, my discovery has proved most valuable in connection with complicated, multiple curve bends, and it will be described in that connection here.

Thus, the particular embodiment illustrated in the drawings employs a contour type, male mold 10, shaped to produce an extremely difficult bend that was used in the glazing of military aircraft during the late war.

It will be seen from the shape of the mold 10 (Fig. 1) that the bend in question involves a relatively deep curve of medium length along the forward margin of the glass sheet, beginning at the right and indicated at $a$; and that, after reaching its rather broad peak at $b$, this curve merges into a long shallow one, designated $c$, leading toward the left. On the other hand the opposite margin of the sheet, which starts from a different level than the first, will be bent over a curve $d$ which is quite similar to curve $a$ but rises to a relatively sharp peak $e$ and then drops quickly toward its end along a short, shallow but relatively steep curve $f$. The contours of the two end sections of the mold are uniform except for a slight angular differential indicated at $g$, but the shape of the middle portion of the glass sheet, when bent to the mold contour, should be of constantly changing curvature graduating from the form of one marginal side edge to that of the other. In addition, the entire mold is arcuate in shape by reason of the longitudinal sides being curved in the horizontal plane (Fig. 2).

However, even this intricate contour of double or compound conic bend can be readily and accurately produced, in finished glass sheets of high quality, on a commercial scale, by the bending technique of the present invention. Briefly stated this technique involves, primarily, the supporting of the sheet against bending forces during its initial heating period and, second, the completion or finishing of the bend by the application of mechanical pressure.

In addition to the bending mold 10, already referred to, the apparatus shown in the drawings for carrying out my special bending method includes a temporary supporting means for the glass which is designated in its entirety by the numeral 11, and a pressure member 12 hinged to the mold as at 13.

The mold 10 is preferably of the peripheral type and is made up of the two longitudinally curved, sheet metal sides 14 and 15, of different lengths; and two shorter, straight, sheet metal ends 16 and 17 connecting the longitudinal sides. The upper edges of the sides 14 and 15, and the end 16, are formed to provide the shaping surface of the mold; and a bracing member 18, running from the corner formed by the juncture of the end 16 and side 14 to the side 15, also has its upper edge curved to conform to the curvature desired in the finished glass sheet at that point.

The lower portion of the mold 10 has been broken away, but it can take any convenient shape and may be supported on a skeleton metal framework if desired. The exact type of mold base or standard is not important except that it should be such as to permit the mold to be readily positioned within the particular kind of heating or bending kiln that it is intended to use.

Located at one end of the mold 10 is a sheet edge holder 18' (Figs 1 and 3) for initially positioning and maintaining the glass to be bent in contact with the shaping surface of the mold. The holder is essentially channel-shaped and includes a substantially U shaped metal shell 19, welded to the rear end 17 of the mold and within which is carried a refractory block 20 of similar conformation. This block 20 may be of any suitable insulating and refractory material and is provided with openings 21 in its rear wall, which also extend through the metal shell 19, to allow circulation of air and prevent chill cracking of the glass.

The apparatus shown is capable of bending up to four sheets of glass of varying thickness at one time, and the block 20 is made to accommodate the full number. However, better results have been had when only two sheets are bent at a time, and in these circumstances it is desirable to use a filler wedge as shown at 22 (Fig. 1). As also illustrated in this figure, when a pair of glass sheets 23 to be bent are placed upon the mold 10 with their edges 24 wedged in the block 20, the marginal portion of the lower sheet 23a that is adjacent the edge 24 will be against the shaping surface of the mold, while the body of the glass sheets and their opposite ends 25 will be suspended in the air above the mold.

A foundation for the means 11, which supports the glass sheets against bending while they are being heated up to the desired bending temperature, is provided by a pair of angle irons 26 and 27 extending outwardly and upwardly from the end 16 of the mold 10 and having their outer ends connected by a cross angle iron 28. Welded, or otherwise attached, to the upper web of the cross angle 28 is a looped bracket 29 (Figs. 2 and 4), adapted to support a strip of glass 30 lying between the bracket 29 and the free end 25 of the glass sheets 23.

In order to maintain the strip 30 and the sheets 23 in assembled relation for the proper length of time, there is provided a metal retaining clip 31 (Figs. 1 and 5). This clip is preferably made from a substantially square sheet of thin sheet metal which is bent into an inverted U shape 32, with one leg 33 of the U being provided with a wide laterally extending flange 34. The portion of the metal blank from which the leg 33 and the flange 34 is bent is originally somewhat longer than the portion that is bent into the rest of the U shape 32; and this extra length is then bent back to form the retaining flanges 35 and 36. Also, a section is cut in the flange 34 and leg 33 and then bent upwardly to form a tongue 37. In use, the U shaped portion 32 of the clip fits loosely over the edges 25 of the glass sheets 23, and the upper end of the strip 30 is received between the flange 34 and tongue 37, being prevented from slipping laterally out of place by the retaining flanges 35 and 36.

The hinged pressure member 12 is in the form of a three-sided frame, conforming in shape but slightly larger than the mold 10 so that when in lowered position (as shown in Fig. 2 and indicated in broken lines in Fig. 1) the member 12 fits over the mold 10 and is equally spaced outwardly therefrom on all three sides. The hinge point 13 of the pressure member 12 is provided by a rod 38, extending parallel with the rear end 17 of the mold 10 and welded to a pair of channel irons 39 extending rearwardly therefrom. A pair of angle irons 40 fit over, and are swingably mounted on, the ends of the rod 38; and the two ends of the member 12 are welded to these angle irons as at 41.

The bending apparatus just described can be used in connection with any of the well known types of bending furnaces or kilns, but is most valuable in a continuous type bending furnace, for example like that disclosed in the patent to C. F. Binkert and myself 2,337,849, issued June 12, 1945. In such a kiln type furnace, the bending mold is mounted on suitable carriages which carry it into and through various heating zones.

With my present invention I prefer to divide the furnace into four zones, namely, (1) a preheating zone, (2) a prebending zone, (3) a bending zone, and (4) a cooling zone. The length and temperatures of these several zones, and the length of time the glass sheets spend in each one, will vary with a number of different factors. However, time, temperature and space should be so balanced that: in the preheating zone the glass sheet will be gradually raised to the desired bending temperature; as the mold moves through the prebending zone the glass should be soft enough to take an initial bend that conforms roughly to the shape of the mold; in the bending zone the glass sheets are brought to final form which exactly duplicate the contour of the bending mold itself; and in the cooling zone the bends are set and the sheets conditioned to face the outside atmosphere.

In practicing my invention, molds 10 are mounted on suitable furnace carriages and, as fast as the molds are loaded, the cars are moved into and through the furnace, emerging at the discharge end with the glass sheets thereon properly shaped and ready for use. Loading the molds consists in placing the glass sheets thereon in the manner shown in Fig. 1 with a glass strip 30 supporting the ends 25 of the sheets 23.

The fact that the glass sheet to be bent is arranged in the manner shown is important to the formation of accurate bends because the free end of the sheets, in which the greatest bending must take place, is toward the cap or hottest part of the furnace; while the lower portion of the sheets, which requires considerable less shaping, is in a cooler strata of the furnace. This also prevents sagging of the lower part of the sheets into the mold to give a convex instead of the desired concave bend.

The glass strip 30 serves to support the free end of the glass sheets during movement of the mold 10 into and through the preheating zone of the furnace, and thus prevents breaking of the relatively cold sheets under the strain of supporting the weight of the free portions thereof from one end only, aggravated by vibrations resulting from travel of the car. By the time a mold has reached the prebending zone, however, the strip 30 will begin to bow downwardly and to thus withdraw its support from the free end of the glass sheets.

Because the strip 30 is of lesser volume or mass than the glass sheets 23, it will bend more readily than the sheets and so will not interfere with their bending action once the bending temperature is reached. Instead, the supporting strip will move slowly out of the way and serve to ease the bending glass sheets down toward the mold.

In other words, the glass strip 30 constitutes a supporting means for the glass sheets that is thermostatically operable to gradually withdraw its support as the need passes. In the prebending zone, this temperature controlled supporting action serves to prevent distorted bending resulting from the strains that would be set up in the glass by weight of cantilevered sheets, and the high temperatures in that part of the furnace. Moreover, because the speed and facility with which the glass strip bends is determined by its mass or volume, these bending characteristics can be accurately controlled by varying either the thickness or width of the strip used. Generally speaking, I have found a one inch strip of regular plate glass to give very satisfactory results. However, narrower strips will bend more quickly and easily, and wider ones will resist bending longer and sag more slowly. Heat absorbing glass strips will of course bend faster than those of ordinary plate glass of equal mass.

The cross angle 28 and looped bracket 29, supporting the lower end of the strip 30, and the clip 31, supporting the upper end, are so arranged that, while the mold 10 is within the prebending zone, the glass strip will eventually sag far enough to release itself from both and will drop down onto the mold carriage and out of the way.

Subsequently, and by the time the mold has reached the end of the prebending zone, the glass sheet will have bent by gravity far enough to be in contact with the high points b and e on the mold shaping surface, and to conform roughly to the form that is finally desired. Indeed, in the case of less complicated bends, the finished bend may be accurately produced by gravity bending alone.

However, with a mold shape such as that illustrated in the drawings, additional pressure of a more positive nature is required to exactly reproduce the mold contour. This is done, according to the invention, by the operator's reaching into the bending zone of the furnace with a suitable metal bar, engaging the loop 41 on the pressure member 12, and moving this member slowly down into contact with the margins of the upper surfaces of the glass sheets 23. The weight of the three-sided frame acts to gently but firmly force the preliminarily bent sheets down into complete engagement with the mold shaping surface throughout its entire extent and to precisely shape the glass to the desired contour.

Prior to being brought into use, the frame 12 is in the position shown in Fig. 1, being held from falling backward by the stop 43. This same stop also prevents downward movement of the frame beyond the desired bending position to where it might crimp the glass over the mold edge. The sides of the frame 12 are preferably made T shape in cross section to provide a substantially continuous glass contacting edge 42; and the two longitudinal sides may be hinged at the middle, or made of link construction, to insure maximum conformance to the sheet surface, if desired.

When glass sheets are to be bent on the apparatus just described, it is usually desirable to bend sheets of larger size than are actually required. In this way finished lights can be cut from that portion of the bent sheets that lies inside of the mold outline and that have not been contacted either by the mold itself or by the pressure frame.

In the particular shape illustrated, the finished lights are cut along lines inwardly from and paralleling the sides 14 and 15 and the cross brace 18 of the mold 10. Nevertheless, it is preferred to initially bend a sheet that is large enough to extend outwardly over the end wall 16, although the straight outer end of the frame 12 may follow the angling brace 18, instead of the wall 16, if desired. In any event, it will be understood that these and various other changes in the shape, size and arrangement of parts may be resorted to without departing from the spirit of the invention or the scope of the subjoined claims.

I claim:

1. In a method of bending glass sheets during which a sheet is gradually heated to the bending temperature of the glass, the steps of supporting both ends of a sheet to be bent against the action of gravity until said sheet has reached a predetermined temperature, and then withdrawing the support from one end of the sheet while continuing to support the other end.

2. In a method of bending glass sheets during which a sheet is gradually heated to the bending temperature of the glass, the steps of supporting both ends of a sheet to be bent against the action of gravity until said sheet has reached a predetermined temperature, withdrawing the support from one end of the sheet while continuing to support the other end, and applying mechanical bending force to said sheet.

3. In a method of bending glass sheets over a male mold and which includes gradually heating a sheet to the bending temperature of the glass, the steps of mounting said sheet as a cantilever above the mold, supporting the ends of the sheet against the action of gravity while cold and during the early stages of said heating, and withdrawing the support from the free end of the sheet only when the sheet reaches a predetermined temperature.

4. In a method of bending glass sheets over a male mold and which includes gradually heating a sheet to the bending temperature of the glass, the steps of mounting said sheet as a cantilever above the mold, supporting the ends of the sheet against the action of gravity while cold and during the early stages of said heating, withdrawing the support from the free end of the sheet only when the sheet reaches a predetermined temperature, and finally pressing the sheet against said mold.

5. The combination with apparatus for bending glass sheets which includes means for heating said sheets to the bending temperature of the glass, of means for supporting one end of said sheets during bending, and temperature responsive means for supporting the opposite end of the sheets during the preliminary heating thereof and for withdrawing support when the glass sheets reach a predetermined temperature.

6. The combination with apparatus for bending glass sheets which includes means for heating said sheets to the bending temperature of the glass, of means for supporting one end of said sheets during bending, temperature responsive means for supporting the opposite end of the sheets during the preliminary heating thereof and for withdrawing support when the glass sheets reach a predetermined temperature, and means for applying a positive bending force to said sheet.

7. The combination with apparatus for bending glass sheets which includes means for heating said sheets to the bending temperature of the glass, of a mold upon which the sheet is to be bent and against which a part of the sheet is supported before bending, and temperature responsive means for supporting a free portion of the sheet from below during one period of the heating thereof and movable out of supporting position at a predetermined temperature.

8. In apparatus for bending glass sheets, a mold, and a glass member of less mass than the sheet to be bent for temporarily supporting said sheet above the mold.

9. In apparatus for bending glass sheets, a mold over which a sheet is to be bent, and a glass member bendable at a lower temperature than said sheet positioned to initially resist movement of the sheet toward the mold.

10. In apparatus for bending glass sheets, a mold over which a sheet can be bent, a glass strip bendable at a lower temperature than said sheet associated with said mold in a position to contact a free portion of a glass sheet thereupon, and means for temporarily maintaining said sheet and said strip in assembled relationship.

11. In apparatus for bending glass sheets, a mold over which a sheet can be bent, a glass strip of less volume than the glass sheet associated with the mold in a position to contact a free portion of a glass sheet thereupon, means engageable with said sheet and said strip for holding them in assembled relation and for releasing the one from the other at a predetermined temperature.

12. In apparatus for bending glass sheets, a mold, and a strip of heat absorbing glass positioned to temporarily prevent a glass sheet above said mold from moving theretowards.

13. In apparatus for bending heated glass sheets, a mold upon which a sheet can be bent, a glass strip positioned to support a sheet on said mold from below, and a swingably mounted member adapted to apply pressure to the top surface of said sheet.

14. In apparatus for bending heated glass sheets, a mold, a perforated U shaped member for supporting one end of a sheet to be bent in contact with the mold during the entire bending cycle, and a glass member more susceptible to heat than the sheet itself for supporting the opposite end of the sheet above said mold.

15. In apparatus for bending heated glass sheets, a mold, a perforated U shaped member for supporting one end of a sheet to be bent in contact with the mold during the entire bending cycle, a glass member more susceptible to heat than the sheet itself for supporting the opposite end of the sheet above said mold, and a pressure member hinged to the mold for movement into operative engagement with the sheet when said last mentioned support has been withdrawn.

16. In apparatus for bending heated glass sheets, a peripheral mold, a glass strip, means outside the area of said mold for supporting said strip, means for temporarily connecting said strip with a glass sheet on the mold, and a peripheral pressure member associated with said mold and mounted for movement into operative contact with a glass sheet on the mold.

JOSEPH E. JENDRISAK.

REFERENCES CITED

The following references are of record in the file of this patent:

UNITED STATES PATENTS

| Number | Name | Date |
|---|---|---|
| 673,615 | Connington | May 7, 1901 |
| 1,248,582 | Wiley | Dec. 4, 1917 |
| 1,753,779 | Ferngren | Apr. 8, 1930 |
| 2,021,197 | Owen | Nov. 19, 1935 |
| 2,111,392 | Galey | Mar. 15, 1938 |
| 2,131,873 | Goodwillie | Oct. 4, 1938 |
| 2,301,125 | Kramp et al. | Nov. 3, 1942 |
| 2,420,119 | Boehm et al. | May 6, 1947 |

FOREIGN PATENTS

| Number | Country | Date |
|---|---|---|
| 1,599 | Great Britain | Jan. 21, 1902 |